United States Patent
Barton (10) Patent No.: US 9,652,780 B2
(45) Date of Patent: May 16, 2017

(54) DYNAMICALLY CUSTOMIZING USER QUOTAS

(71) Applicant: Dropbox, Inc., San Francisco, CA (US)

(72) Inventor: Chris Barton, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 821 days.

(21) Appl. No.: 14/049,147

(22) Filed: Oct. 8, 2013

(65) Prior Publication Data

US 2015/0100419 A1    Apr. 9, 2015

(51) Int. Cl.
*G06K 7/00*     (2006.01)
*G06Q 30/02*    (2012.01)

(52) U.S. Cl.
CPC ............... *G06Q 30/0254* (2013.01)

(58) Field of Classification Search
USPC .... 235/375, 378, 379, 380, 383, 385; 705/5, 705/7, 35–45
See application file for complete search history.

(56) References Cited

U.S. PATENT DOCUMENTS

| | | | |
|---|---|---|---|
| 8,359,223 B2 | 1/2013 | Chi et al. | |
| 2002/0194143 A1* | 12/2002 | Banerjee | G06Q 30/0283 705/400 |
| 2009/0144183 A1 | 6/2009 | Gatchell et al. | |
| 2010/0017259 A1* | 1/2010 | Luo | G06Q 30/02 705/7.35 |
| 2010/0035576 A1 | 2/2010 | Jones et al. | |
| 2010/0229218 A1* | 9/2010 | Kumbalimutt | G06F 9/5005 726/4 |
| 2013/0091280 A1 | 4/2013 | Rajakarunanayake et al. | |
| 2013/0178241 A1 | 7/2013 | Duggirala et al. | |

OTHER PUBLICATIONS

Elghoneimy, E.et al., "Resource Allocation and Scheduling in Cloud Computing," Workshop on Computing, Networking and Communications, 2012 International Conference on Computing, Networking and Communications (ICNC), IEEE, Jan. 30, 2012-Feb. 2, 2012, pp. 309-314.
Newman, J., "What to Do When Your Free Cloud Storage Fills Up," Sep. 30, 2013, 4 pages, Can be Retrieved at <URL: http://www.pcworld.com/article/2049880/what-to-do-when-your-free-cloud-storage-fills-up.html#tk.rss_all>.

* cited by examiner

*Primary Examiner* — Matthew Mikels
(74) *Attorney, Agent, or Firm* — Fenwick & West LLP (57) ABSTRACT

An online content management system determines a new account configuration to offer to a user, including the price and/or size of a user's quota of storage space in an account on the online content management system, based on usage characteristics of the account. An account management module tracks account usage. The account management module analyzes the account usage and applies a model to predict the willingness of the user to pay for a new account configuration. Responsive to the results of the prediction, the new account configuration is offered to the user. The user's feedback on the offered new account configuration is tracked. If the user accepts the offer, the user's account details are updated accordingly. If the user rejects the offer, this feedback may be added as input into future predictions of that user's willingness to pay for a new account configuration.

18 Claims, 5 Drawing Sheets

DYNAMICALLY CUSTOMIZING USER QUOTAS

TECHNICAL FIELD

Disclosed embodiments relate to adjusting the price and/or size of a user's quota of storage space in a content management system based on characteristics that describe how the user uses the storage space.

BACKGROUND

An online content management system permits users to store content in association with their accounts on the online content management system. Conventionally, users of the online content management system are offered a set amount of storage space for an established price, regardless of how the user chooses to use the storage space. In some cases, a larger amount of space can be purchased by any user for an established higher price. In one example, a first allotment of space is provided to each user for free, with additional space available for purchase by any user at a set price.

SUMMARY

An online content management system dynamically determines a new account configuration to offer to a user, including the price and/or size of a user's quota of storage space in an account on the online content management system, based on usage characteristics of the account. An account management module tracks account usage. The account management module analyzes the account usage and applies a model to predict the willingness of the user to pay for a new account configuration. Responsive to the results of the prediction, the new account configuration is offered to the user. The new account configuration includes a combination of a quota size and price, and may include other account features or information. The user's feedback on the offered new account configuration is tracked. If the user accepts the offer, the user's account details are updated accordingly. If the user rejects the offer, this feedback may be added as input into future predictions of that user's willingness to pay for a new account configuration.

The features and advantages described in this summary and the following detailed description are not all-inclusive. Many additional features and advantages will be apparent to one of ordinary skill in the art in view of the drawings, specification, and claims hereof.

The figures show various embodiments of the present invention for purposes of illustration only. One skilled in the art will recognize from the following description that alternative embodiments of the structures and methods shown may be used without departing from the principles of this invention.

DETAILED DESCRIPTION

System Overview

Figure 1:
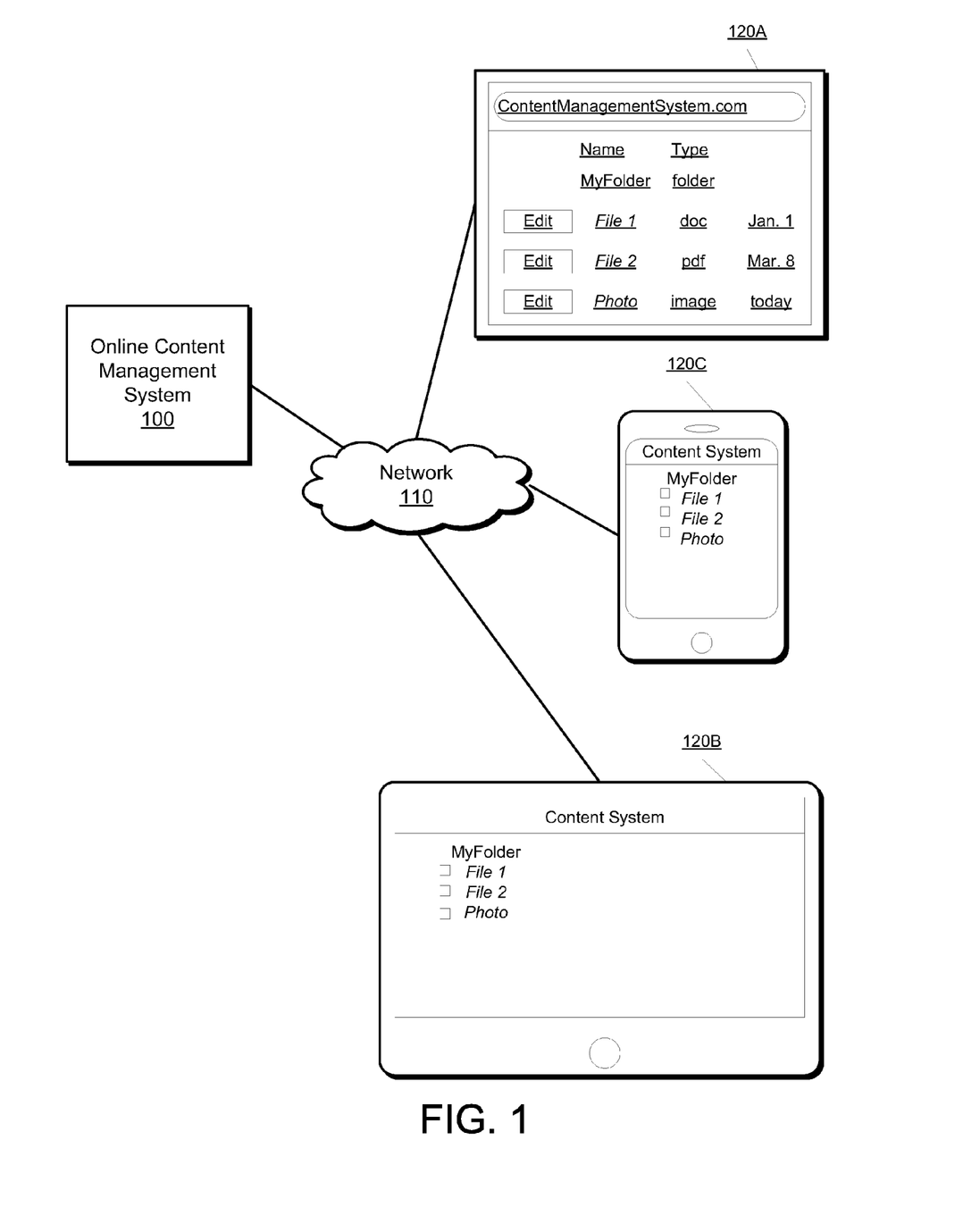
FIG. 1 shows a diagram of a system environment of an online content management system, according to one embodiment.

FIG. 1 shows a system environment including online content management system 100 and client devices 120A, 120B, 120C (collectively or individually "120") connected by network 110. Online content management system 100 provides content storage, sharing, and synchronization services for users of client devices 120. These services allow a user to access their content stored in the user's quota of storage space on online content management system 100 from any of their client devices 120 and allow users to share content with other users of client devices 120. In addition to content storage and sharing, online content management system 100 updates shared content responsive to changes and enables users to synchronize changes across multiple client devices 120. A user may synchronize content across multiple client devices 120 owned by the user and associated with the user's account, and the user may share content that is synchronized with devices associated with other users' accounts. The content stored by online content management system 100 can include any type of data, such as digital data, documents, media (e.g., images, photos, videos, audio, streaming content), data files and databases, source and object code, recordings, and any other type of data or file, hereinafter collectively referred to as "content items." The content stored by online content management system 100 may be organized in folders, tables, collections, or in other database structures (e.g., object oriented, key/value etc.). Generally, each user's account is associated with a limited quota of storage space, and the total storage space required to store all of the user's content items may not exceed the user's current quota. Adjustments to the user's current quota may be available from online content management system 100.

In the environment of FIG. 1, each client device 120 accesses content through online content management system 100. Thus, each client device 120 may jointly access various types of content, such as a folder MyFolder containing files such as file 1, file 2, and photo. Various types of devices can function as a client device, such desktop computer 120A, tablet computer 120B, and mobile device 120C. Any device capable of accessing online content management system 100 and interacting with the content items stored on content management system 100 may be used as client device 120.

Users may create accounts at content management system 100 and store content in online content management system 100 by transmitting the content from client device 120 to online content management system 100. Users may also store content on online content management system 100 by (for example) requesting transfer of content items from other content providers to online content management system 100. The content stored by users in online content management system 100 is associated with user accounts that may have various privileges. The privileges may include viewing the content item, modifying the content item, modifying user privileges related to the content item, deleting the content item, and sharing the content item with other users. The content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. In another example, an account can include a downloads folder that is the default folder in which content items from third-party content servers are stored. An account can also include shared folders or group folders that are linked with and available to multiple user accounts. The permissions for multiple users may be different for a shared folder.

Client devices 120 communicate with online content management system 100 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on network 110 can include multi-protocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, online content management system 100 and client devices 120 use custom and/or dedicated data communications technologies instead of, or in addition to, the ones described above.

Figure 2:
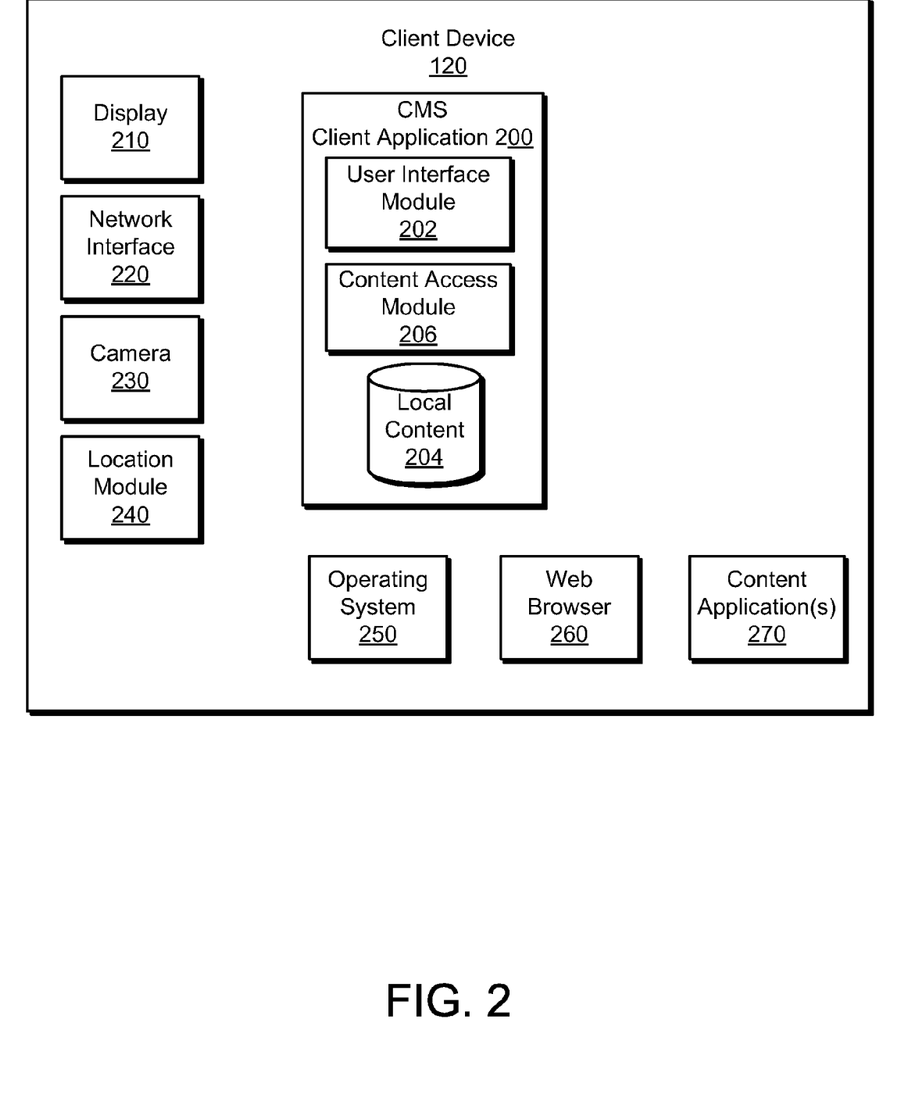
FIG. 2 shows one embodiment of components of a client device.

FIG. 2 shows one embodiment of components of client device 120. Client device 120 generally includes devices and modules for communicating with content management system 100 and a user of client device 120. Client device 120 includes display 210 for providing information to the user, and in certain client devices 120, display 210 is a touch-screen. Client device 120 also includes network interface 220 for communicating with content management system 100 via network 110. Other conventional components of client device 120 that are not material are not shown, for example, one or more computer processors, local fixed memory (RAM and ROM), as well as optionally removable memory (e.g., SD-card), power sources, and audio-video outputs.

Client devices 120 maintain various components and modules for operating the client device and accessing online content management system 100. The software modules include operating system 250 and one or more content applications 270. Content applications 270 vary based on the client device, and may include various applications for creating, viewing, consuming, and/or modifying content stored on online content management system 100, such as word processors, spreadsheets, database management systems, code editors, image and video editors, e-book readers, audio and video players, and the like. Operating system 250 on each device provides a local file management system and executes the various software modules such as content management system client application 200 and content applications 270.

Client device 120 access online content management system 100 in a variety of ways. Client device 120 may access online content management system 100 through a native application or software module, such as content management system client application 200. A schematic example display from content management system client application 200 is shown in FIG. 1 on client devices 120B and 120C. Client device 120 may also access online content management system 100 through web browser 260 as shown in FIG. 1 on client device 120A. As an alternative, the client application 200 may integrate access to online content management system 100 with the local file management system provided by operating system 250. When access to online content management system 100 is integrated in the local file management system, a file organization scheme maintained at online content management system 100 is represented as a local file structure by operating system 250 in conjunction with client application 200.

Client application 200 manages access to online content management system 100. Client application 200 may take various forms, such as a stand-alone application, an application plug-in, or a browser extension. Client application 200 includes user interface module 202, local content 204, and content access module 206.

User interface module 202 of client application 200 generates an interface to the content accessed by client application 200, as variously illustrated herein, and is one means for performing this function. The generated interface is provided to the user by display 210.

Local content 204 may store content accessed from online content management system 100 by client application 200. While represented here as within client application 200, local content 204 may be stored with other data for client device 120 in non-volatile storage. When local content 204 is stored this way, the content is available to the user and other applications or modules, such as content applications 270, even when client application 200 is not in communication with online content management system 100.

Content access module 206 of client application 200 manages updates to local content 204 and communicates with online content management system 100 to synchronize content modified by client device 120 with content maintained on online content management system 100, and is one means for performing this function.

In certain embodiments, client device 120 includes additional components such as camera 230 and location module 240. Camera 230 may be used to capture images or video for upload to the online content management system 100. Location module 240 determines the location of client device 120, using for example a global positioning satellite signal, cellular tower triangulation, or other methods. Location module 240 may be used by client application 200 to obtain location data and add the location data to metadata about a content item, such as an image captured by camera 230.

Figure 3:
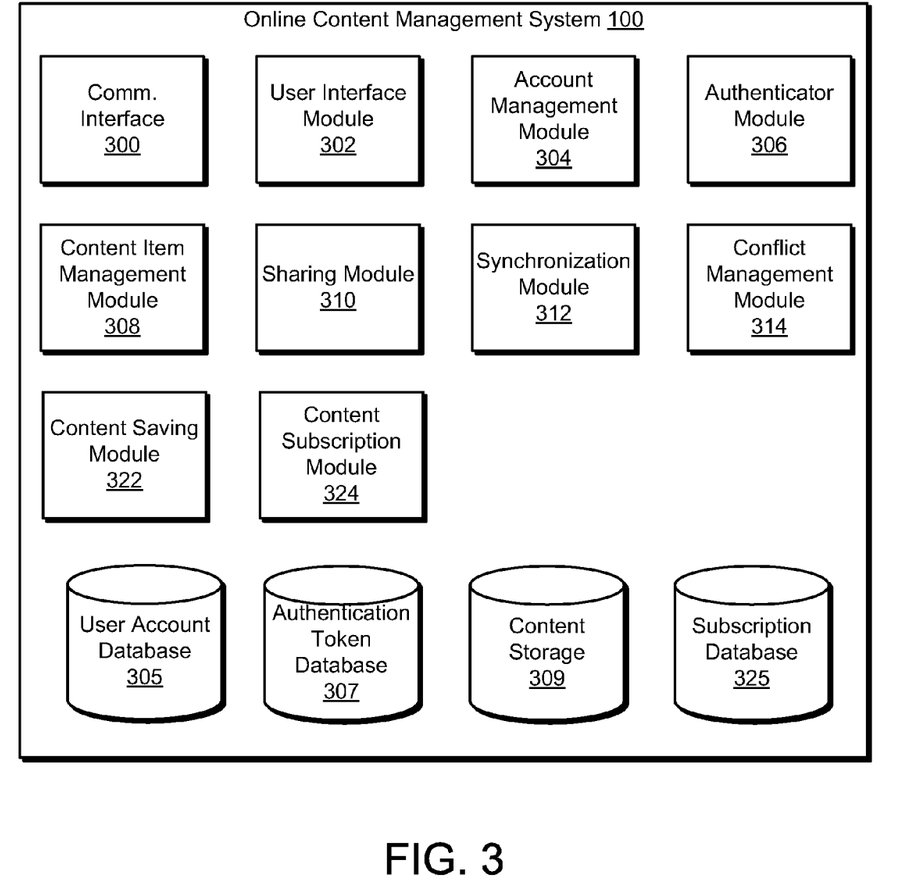
FIG. 3 shows components of an online content management system, according to one embodiment.

FIG. 3 shows components of online content management system 100 according to one embodiment. Online content management system 100 includes communication interface 300, user interface module 302, account management module 304, user account database 305, authenticator module 306, authentication token database 307, content item management module 308, content storage 309, sharing module 310, synchronization module 312, conflict management module 314, content saving module 322, content subscription module 324, and subscription database 325.

Communications interface 300 enables online content management system 100 to interface with various client devices 120, and with other content and/or service providers via an Application Programming Interface (API), which is one means for performing this function. Certain software applications access content stored by the online content management system 100 via an API on behalf of a user. For example, a software package, such as an app on a smartphone or tablet computing device, can programmatically make calls directly to online content management system 100, when a user provides credentials, to read, write, create, delete, share, or otherwise manipulate content. Similarly, the API can allow users to access all or part of content stored by online content management system 100 through a web site.

User interface module 302 generates a web interface that allows a user to view or manipulate content, and is one means for performing this function. For example, the user can navigate in web browser 260 to a web address provided by online content management system 100. Changes or updates to content stored by online content management system 100 made through the web interface, such as uploading a new version of a file, are synchronized back to other client devices 120 associated with the user's account. Multiple client devices 120 may be associated with a single account and files in the account are synchronized between each of the multiple client devices 120.

Account management module 304 can be configured to update and/or obtain user account details stored in user account database 305, and is one means for performing this function. Account management module 504 can be configured to interact with any number of other modules in online content management system 100. The operation of account management module 504 in determining a new account configuration to offer to a user based on the user's usage of the user's account will be described in detail below with reference to FIGS. 4-5.

User account database 305 maintains details of the user accounts, and is one means for performing the function of maintaining user account details. An account can be used to store content, such as documents, text files, audio files, video files, etc., from one or more client devices associated with the account. User account database 305 can store profile information for registered users. In some cases, the only personal information in the user profile can be a username and/or email address. However, online content management system 100 can also be configured to accept additional user information, such as password recovery information, demographics information, payment information, and other details. Each user is associated with an identifier, such as a userID or a user name. User account database 305 can also include account management information, such as account type, e.g. free or paid; usage information for each user, e.g., file edit history and file access history from each client device 120 used by the user; maximum storage space authorized; storage space used; content storage locations; security settings; personal configuration settings; content sharing data; etc.

Authenticator module 306 verifies user credentials, security tokens, API calls, specific client devices, etc., to determine whether access to requested content items is authorized, and is one means for performing the function of determining whether access to content items is authorized. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 307. Upon receiving a request to validate an authentication token, authenticator module 306 checks authentication token database 307 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate, delete, or mark as used the matching authentication token in the authentication token database 307 to prevent future re-use of a single-use token.

Content item management module 308 maintains a content directory that identifies the location of each content item in content storage 309, and allows client applications 200 to request access to content items in content storage 309, and is one means for performing these functions. A content entry in the content directory can also include a content pointer that identifies the location of the content item in content storage 309. For example, the content entry can include a content pointer designating the storage address of the content item in memory. In some embodiments, the content entry includes multiple content pointers that point to multiple locations, each of which contains a portion of the content item.

Content storage 309 stores content items and is one means for performing the function of storing content items. Content storage 309 can be a storage device, multiple storage devices, or a server. Alternatively, content storage 309 can be a cloud storage provider or network storage accessible via one or more communications networks. In one configuration, online content management system 100 stores the content items in the same organizational structure as they appear on client device 120. However, online content management system 100 can store the content items in its own order, arrangement, or hierarchy. Content storage 309 can also store metadata describing content items, content item types, and the relationship of content items to various accounts, folders, or groups. The metadata for a content item can be stored as part of the content item or can be stored separately. In one configuration, each content item stored in content storage 309 can be assigned a system-wide unique identifier. Content storage 309 can decrease the amount of storage space required by identifying duplicate files or duplicate segments of files. In one embodiment, for example, a content item may be shared among different users by including identifiers of the users within ownership metadata of the content item (e.g., an ownership list), while storing only a single copy of the content item and using pointers or other mechanisms to link duplicates with the single copy. Similarly, content storage 309 stores files using a file version control mechanism that tracks changes to files, different versions of files (such as a diverging version tree), and a change history. The change history includes a set of changes that, when applied to the original file version, produces the changed file version.

Sharing module 310 manages sharing content publicly or privately, and is one means for performing the function of managing sharing. Sharing content publicly can include making the content item accessible from any computing device in network communication with online content management system 100. Sharing content privately can include linking a content item in content storage 309 with two or more user accounts so that each user account has access to the content item. The content can also be shared across varying types of user accounts. In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts. To share a content item privately, sharing module 310 adds a user account identifier to the content entry associated with the content item, thus granting the added user account access to the content item. Sharing module 310 can also be configured to remove user account identifiers from a content entry to restrict a user account's access to the content item. To share content publicly, sharing module 310 generates a custom network address, such as a URL, which allows any web browser to access the content in online content management system 100 without any authentication. The sharing module 310 includes content identification data in the generated URL, which can later be used by online content management system 100 to properly identify and return the requested content item. For example, sharing module 310 can be configured to include the user account identifier and the content path in the generated URL. The content identification data included in the URL can be transmitted to online content management system 100 by client device 120 to access the content item. In addition to generating the URL, sharing module 310 can also be configured to record that a URL to the content item has been created. In some embodiments, the content entry associated with a content item can include a URL flag indicating whether a URL to the content item has been created.

Synchronization module 312 automatically synchronizes content from one or more client devices, and is one means for performing the function of synchronizing content. The synchronization is platform-agnostic. That is, the content is synchronized across multiple client devices 120 of varying type, capabilities, operating systems, etc. For example, client application 200 synchronizes, via synchronization module 512 at online content management system 100, content in client device 120's file system with the content in an associated user account on system 100. Client application 200 synchronizes any changes to specified content (e.g., content located in a designated folder or its sub-folders) with the synchronization module 312. Such changes include new, deleted, modified, copied, or moved files or folders. Synchronization module 312 also provides any changes to content associated with client device 120 to client application 200. This synchronizes the local content at client device 120 with the content items at online content management system 100.

Conflict management module 314 determines whether there are any discrepancies between versions of a content item located at different client devices 120, and is one means for performing this function. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying client device 120 of the later-submitted version.

Content saving module 322 makes content items of third party providers available to a user via the user's account on online content management system 100, and is one means for performing this function. In one embodiment, content saving module 322 receives a request that specifies the user of online content management system 100 for whom the content item should be saved, the content item to be saved, and the content provider that provides the content. Content saving module 322 determines whether the content item has already been stored within content storage 309, and if not, obtains the content item from the third party content provider (if it has not already been obtained) and stores it within content storage 309.

Content subscription module 324 handles user subscriptions to content that is made available on an ongoing basis, and is one means for performing the function of handling user subscriptions to content. A "subscription" represents a plurality of content items provided by a particular content provider over a period of time to a user. In some embodiments, content subscription module 524 handles both the initial establishment of a subscription by a user and also the subsequent obtaining of the content items made available as part of the subscription. When establishing an initial subscription, content subscription module 324 receives, as input, a unique identifier of the user (e.g., a username) to be subscribed and subscription information describing the details of the subscription. Subscription module 324 stores subscription information within subscription database 325.

Subscription database 325 stores subscription information in association with a user identifier, and is one means for performing this function. The subscription information can then be used to obtain new content items that are provided as part of the subscription. In one embodiment, the subscription information includes a URL at which the content item is to be obtained, and optionally an indicator of a frequency at which to check for new content items. More generally, the subscription information may include any form of description of the location and update frequency of content in the subscription, or any type procedural instructions used to obtain new content items.

Online content management system 100 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1G or more of main memory, as well as 500 Gb to 2 Tb of computer readable, persistent storage, and running an operating system such as LINUX or variants thereof. The operations of online content management system 100 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, notes servers, failover servers, network management tools and so forth are not shown so as not to obscure the features of the system. Finally, the functions and operations of online content management system 100 are sufficiently complex as to require implementation on a computer system, and cannot be performed in the human mind simply by mental steps.

Account Management

Figure 4:
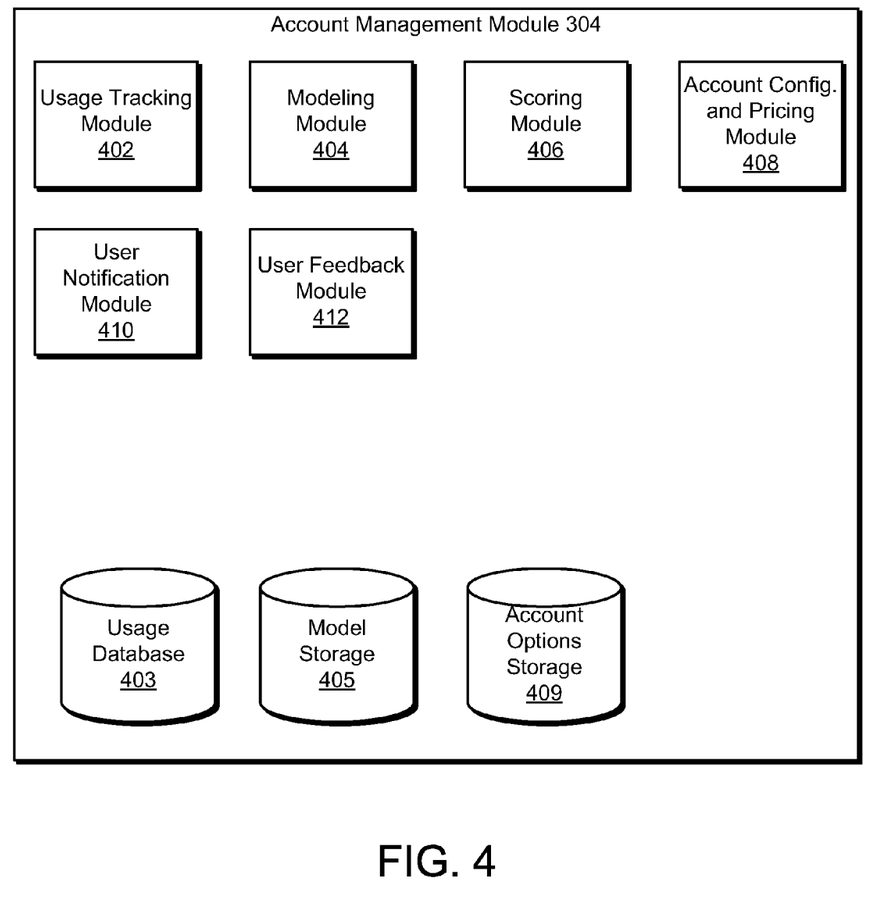
FIG. 4 shows components of an account management module, according to one embodiment.

FIG. 4 shows components of account management module 304 of online content management system 100, according to one embodiment. Account management module 304 includes usage tracking module 402, usage database 403, modeling module 404, model storage 405, scoring module 406, account configuration and pricing module 408, account options storage 409, user notification module 410, and user feedback module 412.

Usage tracking module 402 of account management module 304 tracks each user's respective account usage. Example tracked usage data includes the amount of the user's current quota of storage space consumed, the amount of the user's current quota of storage space remaining, the frequency of access and the timing of access (e.g., during the work week or in the evenings and on weekends), the number and type of client devices 120 linked to the user's account that the user uses to access the account, the physical locations from which users access the account (e.g., according to GPS and or WiFi data from client devices 120), the number and types of content items stored by the user (e.g., text files, images, photographs, audio files, spreadsheets, proprietary file formats used by certain applications, etc.), the number of users with whom the user shares content items, the identity of other users with whom the user shares content items, the frequency of content synching, the number of content subscriptions to which the user subscribes, the presence of key words in the content items stored by the user, and other measures of how the user makes use of the user's account on online content management system 100. All usage data collected, observed, or processed by the usage tracking module 402 may be stored in the usage database 403.

Modeling module 404 builds and refines at least one model of user behavior that predicts a user's willingness to pay for new account configurations based on observed usage characteristics. In one embodiment, machine learning algorithms are used to train models based on the tracked usage data combined with data that indicate whether a user accepted an offered new account configuration. Alternatively or additionally, machine learning clustering analysis can be used to determine how to classify an account based on the usage data. For example, a first class of accounts may include accounts belonging to users who have consumed their entire quotas of storage space, make daily access to their accounts, and exhibit a lot of sharing. A second class may include accounts belonging to users who have consumed somewhat less than their entire quotas of storage space, make only occasional uses of their accounts, and exhibit no sharing. A third class of accounts may include accounts belonging to users who use their accounts primarily to store photos. A fourth class of accounts may include accounts belonging to users who use their accounts primarily to synchronize text documents between their desktop and their tablet during business hours. Analysis of usage of a user's account allows it to be classified, for example, according to the above classes and treated as a member of the class for purposes of offering an account configuration and pricing. Other techniques known in the art for modeling user behavior may be used to develop one or more models with the goal of using the models to identify significant observable features or patterns of features of an account that can inform account management module 304's decision with respect to what account configuration and pricing to offer.

Model storage 405 stores the set of models built and refined by modeling module 404. Depending on the implementation, the stored models may be, for example, a series of observable account characteristics, a threshold set of values for account variables, a formula that combines account usage characteristics according to respective weights, or other ways of expressing the importance or relative importance of at least one usage characteristic of an account in predicting the user's willingness to pay for a new account configuration.

Scoring module 406 applies one or more models from model storage 405 to determine whether a user should be offered a new account configuration and the terms of that offer. Scoring module 406 scores the account against the model by accessing the respective account usage data from usage database 403. The model may also include user profile characteristics as additional features in some embodiments. In those cases, the scoring module 406 may also access user account database 305 for user profile information. The output of scoring module 406 predicts the user's willingness to pay for a new account configuration based on the observed usage characteristics. In one embodiment, scoring module 406 applies a plurality of models to determine which of a plurality of new account configurations to offer to a user based on how closely the user's account usage matches various identified classes of account usage.

Account configuration and pricing module 408, determines, based on the output of scoring module 406, whether a new account configuration should be offered to a user. In one embodiment, different treatments may be applied to different classes of accounts. The treatment variables can include how much storage space to offer, what price to charge, when to offer an upgrade, and when/if the offer will expire, and what additional information to offer. For example, based on the output of scoring module 406, a first user may be offered an upgrade to the user's account including a substantial additional amount of storage space for a small fee, and a second user may be offered a free temporary upgrade to their account including an additional amount of storage space along with an invitation to learn more about the available sharing features of their account. Through this offer, the second user may be enticed to deepen her engagement with online content management system 100, and thus become a better candidate for a new account configuration that generates more revenue for online content management system 100 at a future point in time.

In one embodiment, account options storage 409 stores bundles of account configuration and pricing information for convenience, and may store the account options applied to each user account. However, it is noted that any combination of treatment variables may be offered based on the output of scoring module 406. Thus, account management module 304 can flexibly respond to any observed pattern in account usage that may indicate that a user would be receptive to an upgrade or other new account configuration.

User notification module 410, notifies the user of the user's eligibility for a new account configuration. For example, the user notification module 410 may generate an email to the user or display a notification upon the user's next access of online content management system 100.

User feedback module 412 tracks the user's feedback on the offered account configuration, for example the user's acceptance or refusal of the offer. The user's feedback may be added as additional input to scoring a model that includes acceptance/rejection of an offer as a feature of the model to predict a user's willingness to pay for a new account configuration.

Figure 5:
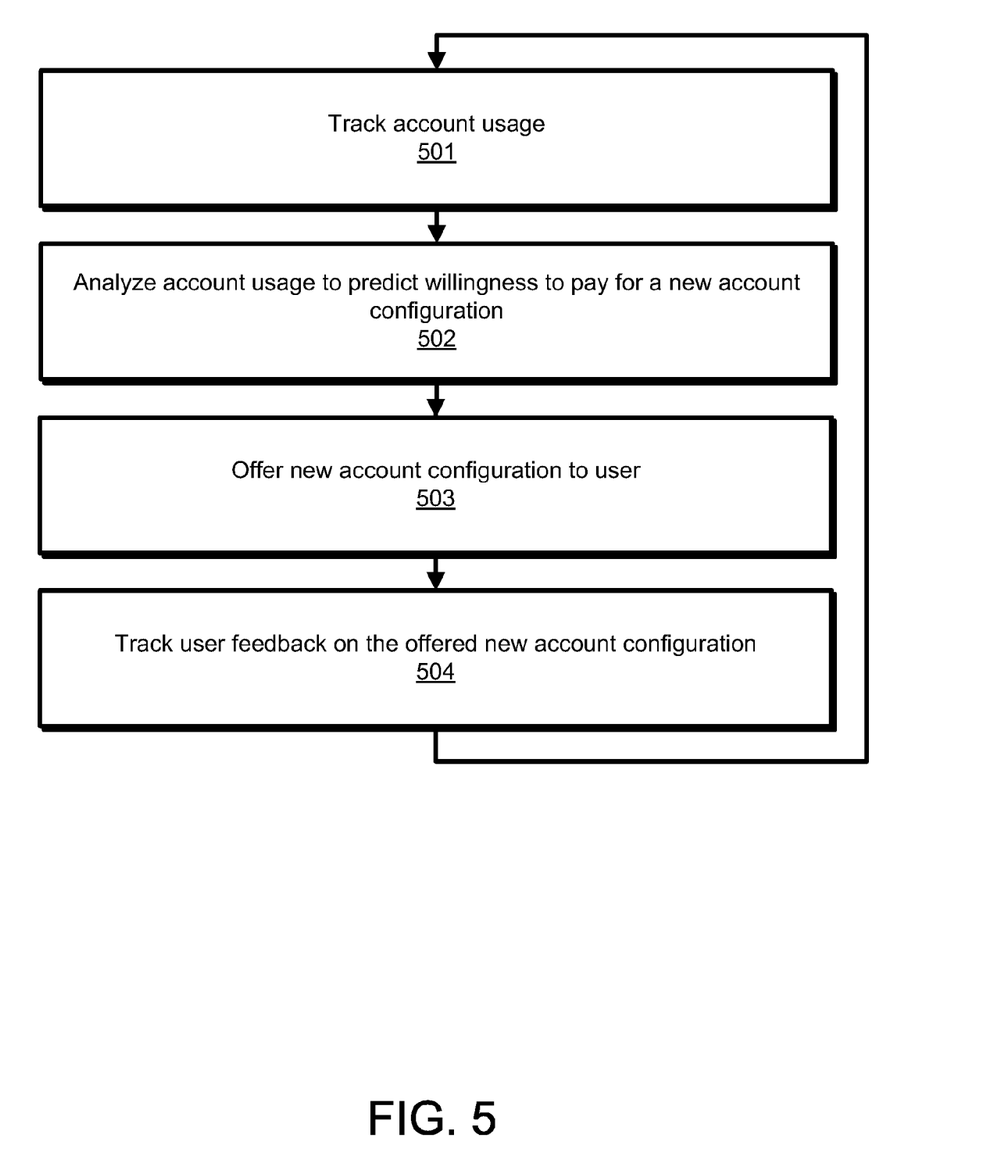
FIG. 5 is a flowchart showing a method of determining a new account configuration to offer to a user based on account usage characteristics.

FIG. 5 is a flowchart showing a method of determining a new account configuration to offer to a user based on account usage characteristics. The steps of the method are described below from the perspective of account management module 304 of online content management system 100, but in other implementations another module or combination of modules of online content management system 100 may perform the method. Moreover, in some implementations not all steps shown need to be performed, and in other implementations additional steps or alternative steps may be performed.

In step 501, account usage is tracked. For example, usage tracking module 402 of account management module 304 may track the frequency and timing of account access, the amount of storage space used, and any other measures of usage.

In step 502, the account usage is analyzed in order to predict willingness of the user to pay for a new account configuration. For example, one or more models may be applied to the tracked account usage to classify or score the account based on the usage. The classification or score may indicate which account configuration to offer. In one embodiment, scoring module 406 of account management module 304 scores the account usage based on a model built by modeling module 404 and stored in model storage 405. The score predicts the user's willingness to pay for a new account configuration.

Responsive to the outcome of step 502 indicating a willingness to pay for a new account configuration, in step 503, the new account configuration is offered to the user. The new account configuration includes a combination of a quota size and price, and may include other account features or information.

In step 504, the user's feedback on the offered new account configuration is tracked. If the user accepts the offer, the user's account details are updated accordingly. If the user rejects the offer, this feedback may be added as input into scoring a model that includes acceptance/rejection of an offer as a feature of the model to predict a user's willingness to pay for a new account configuration.

Steps 501-504 may be iterated over time. This allows the user's history of account usage to grow, the model to be applied to the updated usage data, and account management module 304 to respond to new patterns in usage by offering a new account configuration to better meet the user's needs at a price the user is willing to pay.

Additional Configuration Considerations

The present invention has been described in particular detail with respect to several possible embodiments. Those of skill in the art will appreciate that the invention may be practiced in other embodiments. Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to computational logic for providing the specified functionality. A module can be implemented in hardware, firmware, and/or software. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description. In addition, the present invention is not described with reference to any particular programming language. It will be appreciated that a variety of programming languages may be used to implement the teachings of the present invention, and any references to specific languages are provided for enablement purposes or to describe the best mode.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
    tracking, by a tracking module of an online content management system, usage of a user's account on the online content management system, the tracking comprising determining the number of users with whom the user shares content items;
    analyzing, by a scoring module of the online content management system, the account usage to predict the user's willingness to pay for a new account configuration, the analyzing comprising applying a model of account usage that predicts willingness to pay for a new account configuration based on the number of users with whom content items are shared;
    responsive to a predicted willingness to pay for a new account configuration, offering, by a notification module of the online content management system, a new account configuration to the user, the new account configuration comprising a size of quota of storage space and a price; and
    tracking, by a user feedback module of the online content management system, user feedback on the offered new account configuration.

2. The computer-implemented method of claim 1, wherein tracking usage of the account comprises tracking an amount of the user's current quota of storage space that is consumed, tracking an amount of the user's current quota of storage space remaining, and tracking the frequency of access; and wherein analyzing the account usage comprises applying a model of account usage that predicts willingness to pay for a new account configuration based on the amount of the user's current quota of storage space consumed, the amount of the user's current quota of storage space remaining, and the frequency of access.

3. The computer-implemented method of claim 1, wherein tracking usage of the account comprises tracking the number and type of content items stored by the user; and wherein analyzing the account usage comprises applying a model of account usage that predicts willingness to pay for a new account configuration based on the number and type of content items stored by the user.

4. The computer-implemented method of claim 1, wherein tracking usage of the account comprises tracking the number of client devices linked to the user's account; and wherein analyzing the account usage comprises applying a model of account usage that predicts willingness to pay for a new account configuration based on the number of client devices linked to the user's account.

5. The computer-implemented method of claim 1, wherein analyzing the account usage comprises applying a formula that combines account usage characteristics according to respective weights to predict the user's willingness to pay for a new account configuration.

6. The computer-implemented method of claim 1, further comprising:

responsive to the user accepting the offered new account configuration, updating, by an account management module of the online content management system, the user's account details to include the new size of quota of storage space and price.

7. A computer program product stored on a non-transitory computer-readable medium and including instructions configured to cause a processor to execute steps comprising:

tracking, by a tracking module of an online content management system, usage of a user's account on the online content management system, the tracking comprising determining the number of users with whom the user shares content items;

analyzing, by a scoring module of the online content management system, the account usage to predict the user's willingness to pay for a new account configuration, the analyzing comprising applying a model of account usage that predicts willingness to pay for a new account configuration based on the number of users with whom content items are shared;

responsive to a predicted willingness to pay for a new account configuration, offering, by a notification module of the online content management system, a new account configuration to the user, the new account configuration comprising a size of quota of storage space and a price; and tracking, by a user feedback module of the online content management system, user feedback on the offered new account configuration.

8. The computer program product of claim 7, wherein tracking usage of the account comprises tracking an amount of the user's current quota of storage space is consumed, tracking an amount of the user's current quota of storage space remaining, and tracking the frequency of access; and wherein analyzing the account usage comprises applying a model of account usage that predicts willingness to pay for a new account configuration based on the amount of the user's current quota of storage space consumed, the amount of the user's current quota of storage space remaining, and the frequency of access.

9. The computer program product of claim 7, wherein tracking usage of the account comprises tracking the number and type of content items stored by the user; and wherein analyzing the account usage comprises applying a model of account usage that predicts willingness to pay for a new account configuration based on the number and type of content items stored by the user.

10. The computer program product of claim 7, wherein tracking usage of the account comprises tracking physical locations from which the account is accessed; and wherein analyzing the account usage comprises applying a model of account usage that predicts willingness to pay for a new account configuration based on the physical locations from which the account is accessed.

11. The computer program product of claim 7, wherein tracking usage of the account comprises tracking the number of client devices linked to the user's account; and wherein analyzing the account usage comprises applying a model of account usage that predicts willingness to pay for a new account configuration based on the number of client devices linked to the user's account.

12. The computer program product of claim 7, wherein analyzing the account usage comprises applying a formula that combines account usage characteristics according to respective weights to predict the user's willingness to pay for a new account configuration.

13. The computer program product of claim 7, the steps further comprising:

responsive to the user accepting the offered new account configuration, updating, by an account management module of the online content management system, the user's account details to include the new size of quota of storage space and price.

14. A system comprising:

a computer processor;

a tracking module stored in a memory and executed by the processor and configured to track usage of a user's account on an online content management system, the tracking comprising determining the number of users with whom the user shares content items;

a scoring module stored in memory and executed by the processor and configured to analyze the account usage to predict the user's willingness to pay for a new account configuration, the analyzing comprising applying a model of account usage that predicts willingness to pay for a new account configuration based on the number of users with whom content items are shared;

a notification module stored in memory and executed by the processor and configured to, responsive to a predicted willingness to pay for a new account configuration, offer a new account configuration to the user, the new account configuration comprising a larger quota of storage space and an increased price;

a user feedback module stored in memory and executed by the processor and configured to track user feedback on the offered new account configuration; and an account management module stored in memory and executed by the processor and configured to, responsive to the user accepting the offered new account configuration, update the user's account details to include the larger quota and increased price.

15. The system of claim 14, wherein tracking usage of the account comprises tracking an amount of the user's current quota of storage space is consumed, tracking an amount of the user's current quota of storage space remaining, and tracking the frequency of access; and     wherein analyzing the account usage comprises applying a model of account usage that predicts willingness to pay for a new account configuration based on the amount of the user's current quota of storage space consumed, the amount of the user's current quota of storage space remaining, and the frequency of access.

16. The system of claim 14, wherein tracking usage of the account comprises tracking the number and type of content items stored by the user; and     wherein analyzing the account usage comprises applying a model of account usage that predicts willingness to pay for a new account configuration based on the number and type of content items stored by the user.

17. The system of claim 14, wherein tracking usage of the account comprises tracking the number of client devices linked to the user's account; and     wherein analyzing the account usage comprises applying a model of account usage that predicts willingness to pay for a new account configuration based on the number of client devices linked to the user's account.

18. The computer-implemented method of claim 1, wherein analyzing the account usage comprises applying a formula that combines account usage characteristics according to respective weights to predict the user's willingness to pay for a new account configuration.

\* \* \* \* \*